(12) United States Patent
Lin

(10) Patent No.: US 10,691,069 B2
(45) Date of Patent: Jun. 23, 2020

(54) LUMINOUS ELECTRONIC CLOCK

(71) Applicant: TSUEN JER ENTERPRISE CO., LTD., Taipei (TW)

(72) Inventor: Cheng-Wei Lin, Taipei (TW)

(73) Assignee: TSUEN JER ENTERPRISE CO., LTD., Taipei (TW)

( * ) Notice: Subject to any disclaimer, the term of this patent is extended or adjusted under 35 U.S.C. 154(b) by 222 days.

(21) Appl. No.: 16/038,219

(22) Filed: Jul. 18, 2018

(65) Prior Publication Data
US 2020/0026241 A1    Jan. 23, 2020

(51) Int. Cl.
*G04B 19/30* (2006.01)
*G01K 9/00* (2006.01)
*G04G 19/10* (2006.01)
*F21Y 115/10* (2016.01)

(52) U.S. Cl.
CPC .......... *G04B 19/30* (2013.01); *G01K 9/00* (2013.01); *G04G 19/10* (2013.01); *F21Y 2115/10* (2016.08)

(58) Field of Classification Search
CPC .......... G01D 11/28; B60K 2370/33; B60K 2370/341; G04G 9/00; G04G 19/30; G04G 19/10; G01K 9/00
USPC .................................... 116/48–49
See application file for complete search history.

(56) References Cited

U.S. PATENT DOCUMENTS

| | | | | |
|---|---|---|---|---|
| 3,490,226 A | * | 1/1970 | Anderson | G04B 19/30 368/67 |
| 3,859,782 A | * | 1/1975 | Kitai | G04B 19/30 368/227 |
| 4,115,994 A | * | 9/1978 | Tomlinson | G04B 19/30 362/23.15 |
| 7,475,999 B2 | * | 1/2009 | Mezouari | G01D 11/28 362/23.16 |
| 7,562,637 B2 | * | 7/2009 | Mori | B60K 37/02 116/300 |
| 8,149,099 B2 | * | 4/2012 | Fournier | G01D 11/28 340/441 |
| 9,829,355 B2 | * | 11/2017 | Ito | G01D 13/28 |
| 2006/0067168 A1 | * | 3/2006 | Winkler | G04G 9/0041 368/67 |

OTHER PUBLICATIONS

Google search PS material—google.com—Apr. 21, 2020.*

* cited by examiner

*Primary Examiner* — Sean Kayes
(74) *Attorney, Agent, or Firm* — Schmeiser, Olsen & Watts, LLP

(57) ABSTRACT

A luminous electronic clock includes a multi-diameter forward tapered case frame; a transparent plate installed in a front circumferential edge of the case frame with a sealing ring mounted between them; a dial spaced behind the transparent plate and having time markers, temperature numbers and humidity numbers provided thereon; clock, thermometer and hygrometer movements mounted on a back side of the dial; hands of the clock and pointers of the thermometer and the hygrometer mounted on movement shafts and located on a front side of the dial; a set of LED lights installed around the clock movement shaft and located behind the dial; battery holders mounted behind the dial; and a case back fixedly held to a rear circumferential edge of the case frame by retaining springs and having windows corresponding to the movements and the battery holders.

11 Claims, 3 Drawing Sheets

LUMINOUS ELECTRONIC CLOCK

FIELD OF THE INVENTION

The present invention relates to a luminous electronic clock, which falls in the technical field of timepiece.

BACKGROUND OF THE INVENTION

Following the constant development of social economy and the constant upgrading of living standards, people keep changing their concepts of consumption and pay more and more attention to their living quality and living environment. For example, consumers' current requirements for some traditional home appliances, such as wall clocks, not only include the practicality of the clocks, but also the aesthetic appearance and the ornamental value of the clocks. It is therefore important for the clock manufacturing industry to provide aesthetic, novel and ornamental clocks.

SUMMARY OF THE INVENTION

A primary object of the present invention is to provide a luminous electronic clock, so as to meet diversified technical requirements for the existing timepieces available in the market.

To achieve the above and other objects, the luminous electronic clock provided according to the present invention includes a case frame, a transparent plate, a dial, a cover plate, a movement, a set of LED lights, battery holders and a case back. The case frame is a multi-diameter forward tapered structure; the transparent plate is installed on the case frame in a front circumferential edge thereof; a sealing ring is provided between the transparent plate and the case frame; the dial is made of a translucent acrylic or PS material and has time markers provided along a radially outer peripheral area on a front side thereof; temperature numbers and humidity numbers are circumferentially arranged into two spaced circles, which are located near two lower lateral side of the dial; the dial is located behind the transparent plate and is spaced from the transparent plate by a certain distance via a spacer frame; a movement shaft hole is provided at a center of each of the dial, the circle of the temperature numbers and the circle of the humidity numbers; the movement include a clock movement, a thermometer movement and a hygrometer movement, and these movements are mounted on a back side of the case back at positions corresponding to the movement shaft holes, so that movement shafts of the clock movement, the thermometer movement and the hygrometer movement are separately extended through the corresponding movement shaft holes; hands of the clock and pointers of the thermometer and the hygrometer are mounted on sections of the movement shafts that are exposed from the front side of the cover plate and the dial; the LED lights are installed in the movement shaft hole and around the movement shaft of the clock movement; the cover plate is installed on the front side of the dial and covers the movement shaft hole; the battery holders are mounted to the back side of the case back; the case back is installed on the case frame in a rear circumferential edge thereof and is fixedly held thereto by a plurality of retaining springs; the case back is provided near an upper portion at a middle position with a hook; and the case back is also provided at positions corresponding to the movements with a window each.

With the present invention, a set of LED lights emit light through the dial, advantageously giving the conventional clock additional functions of lighting to satisfy consumers' diversified demands on the clock market.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

Figure 1:
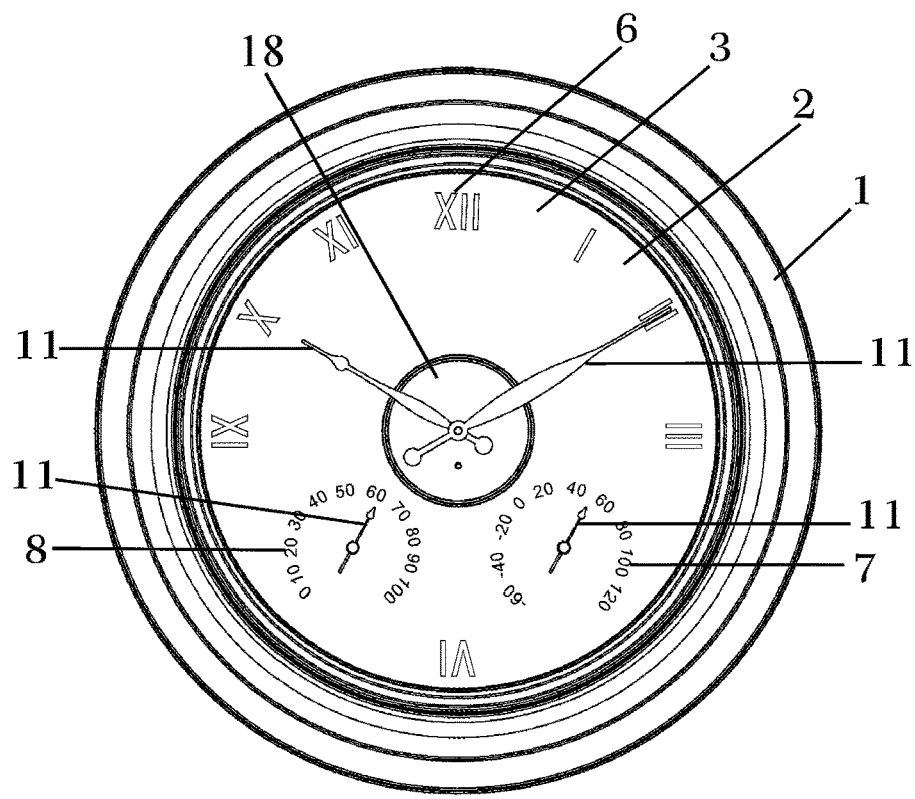
FIG. 1 is a front structural view of a luminous electronic clock according to a preferred embodiment of the present invention.

In the drawings, reference numeral 1 denotes a case frame, 2 denotes a transparent plate, 3 denotes a dial, 31, 32, 33 denote movement shaft holes, 34 denotes a reflecting sheet, 4 denotes battery holders, 5 denotes a case back, 51, 52, 53 denote windows, 6 denotes time markers, 7 denotes temperature numbers, 8 denotes humidity numbers, 9 denotes a thermometer movement, 91 denotes a movement shaft, 10 denotes a hygrometer movement, 101 denotes a movement shaft, 11 denotes hands for the clock and pointers for the thermometer and the hygrometer, 12 denotes retaining springs, 13 denotes a hook, 14 denotes a clock movement, 141 denotes a movement shaft, 15 denotes a sealing ring, 16 denotes a spacer frame, 17 denotes an LED light, 171 denotes light, 18 denotes a cover plate, and 20 denotes a movement.

DETAILED DESCRIPTION OF THE PREFERRED EMBODIMENTS

Figure 2:
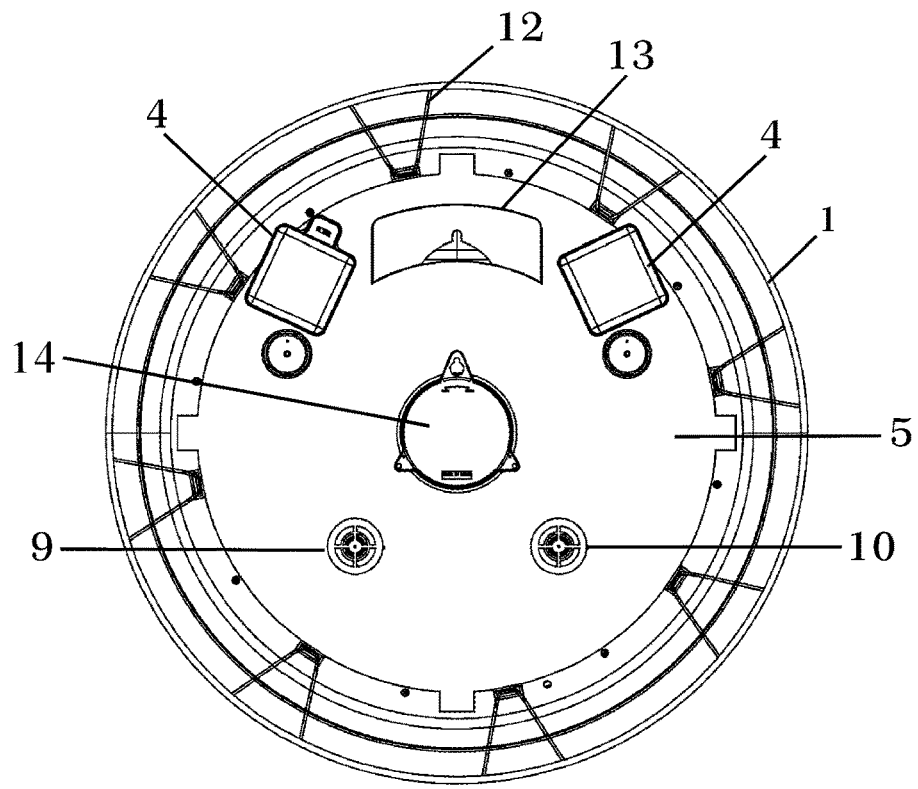
FIG. 2 is a rear structural view of the luminous electronic clock of FIG. 1.
Figure 3:
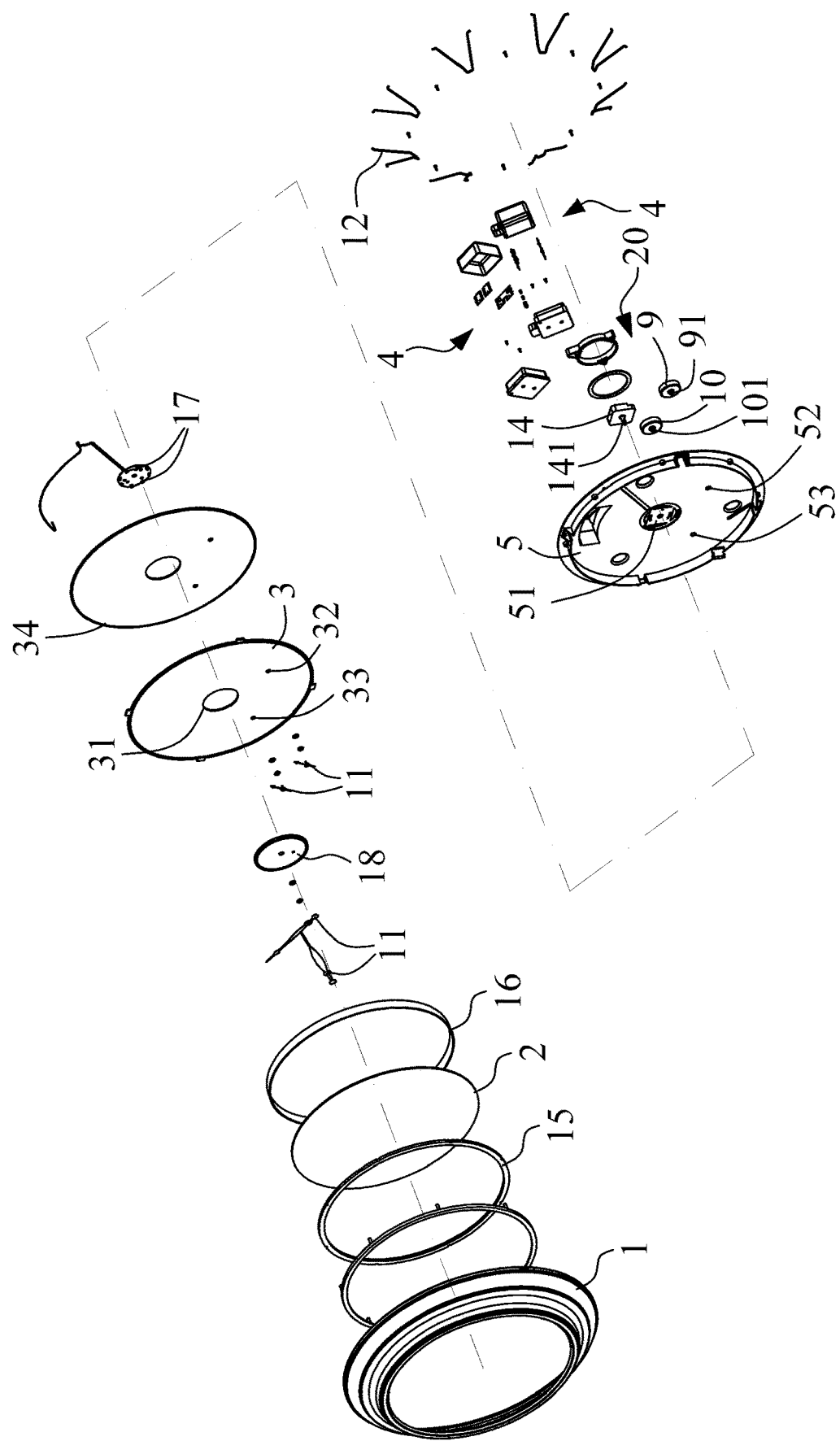
FIG. 3 is an exploded structural view of the luminous electronic clock of FIG. 1.
Figure 4:
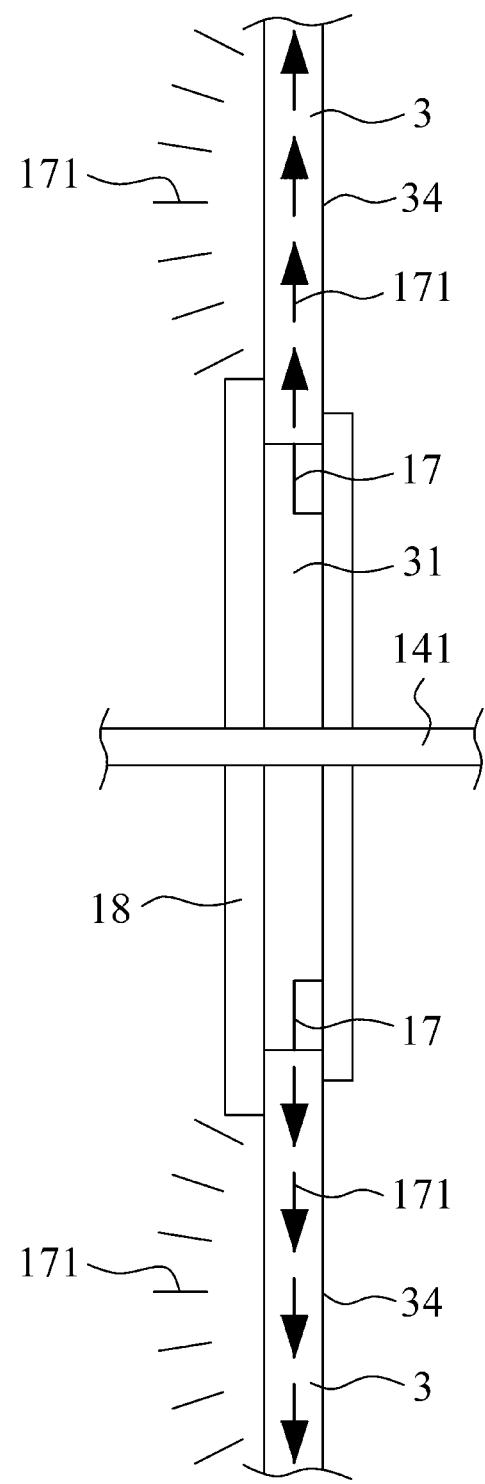
FIG. 4 is a part section view of the luminous electronic clock according to a preferred embodiment of the present invention.

Please refer to FIG. 1 to FIG. 4. For the purpose of conciseness and clarity, the present invention is also briefly referred to as the luminous electronic clock herein. As shown, the luminous electronic clock in the preferred embodiment includes a case frame 1, a transparent plate 2, a dial 3, a cover plate 18, a movement 20, a set of light-emitting-diode (LED) lights 17, battery holders 4 and a case back 5. The case frame 1 is a multi-diameter forward tapered structure. The transparent plate 2 is installed on the case frame 1 in a front circumferential edge thereof. A sealing ring 15 is provided between the transparent plate 2 and the case frame 1. The dial 3 is made of a translucent acrylic or PS material and has a reflecting sheet 34 (made of a PP or PVC material) on a back side thereof and has time markers 6 provided along a radially outer peripheral area on a front side thereof. Temperature numbers 7 and humidity numbers 8 are circumferentially arranged into two spaced circles, which are located near two lower lateral sides of the dial 3. The dial 3 is located behind the transparent plate 2 and is spaced from the transparent plate 2 by a certain distance via a spacer frame 16. Three movement shaft holes 31, 32, 33 are provided at a center of each of the dial 3, the circle of the temperature numbers 7 and the circle of the humidity numbers 8. The movement 20 includes a clock movement 14, a thermometer movement 9 and a hygrometer movement 10. These movements 14, 9, 10 are mounted on a back side of the case back 5 at positions corresponding to the movement shaft holes 31, 32, 33, so that movement shafts 141, 91, 101 of the clock movement 14, the thermometer movement 9 and the hygrometer movement 10 can be separately extended through the corresponding movement shaft holes 31, 32, 33, and the movement shaft 141 of the clock movement 14 is extended through the cover plate 18. Hands 11 for the clock and pointers 11 for the thermometer and the hygrometer are mounted on sections of corresponding movement shafts 141, 91, 101 that are exposed from the front side of the cover plate 18 and the dial 3. The LED lights 17 are installed in the movement shaft hole 31 and around the movement shaft 141 of the clock movement 14. The cover plate 18 is installed on the front side of the dial 3 and covers the movement shaft hole 31. The battery holders 4 are mounted to the back side of the case back 5. The case back 5 is installed on the case frame 1 in a rear circumferential edge thereof and is fixedly held thereto by a plurality of retaining springs 12. The case back 5 is provided near an upper portion at a middle position with a hook 13. The case back 5 is also provided at positions corresponding to the movements 14, 9, 10 with a window 51, 52, 53 each.

In practical use of the present invention, first install batteries in the battery holders 4 and turn on a battery switch for the LED lights 17. After calibrating the clock hands 11, connect the hook 13 to an external nail or hook that is desired for hanging the luminous electronic clock of the present invention in place. Light emitted by the LED lights 17 is through the dial 3 and is reflected by the colored translucent acrylic dial 3 to create a faint, half-illuminated colorful vision that gives the usually dull clock a complete novel appearance.

The present invention has been described with a preferred embodiment thereof and it is understood that the preferred embodiment is only illustrative and not intended to limit the present invention in any way and many changes and modifications in the described embodiment can be carried out without departing from the scope and the spirit of the invention that is intended to be limited only by the appended claims.

What is claimed is:

1. A luminous electronic clock, comprising a case frame, a transparent plate, a dial, a cover plate, a movement, a set of LED lights, battery holders and a case back, characterized in that the transparent plate is installed on the case frame in a front circumferential edge thereof; the dial has a reflecting sheet on a back side thereof and has time markers provided along a radially outer peripheral area on a front side thereof; the dial is located behind the transparent plate; a movement shaft hole is provided at a center of the dial; the cover plate is installed on the front side of the dial and covers the movement shaft hole; the dial is made of a translucent acrylic or PS material; the movement includes a clock movement, and the movement is mounted corresponding to the movement shaft hole, so that a movement shaft of the clock movement is extended through the movement shaft hole and the cover plate; hands for the clock are mounted on sections of the movement shaft that is exposed from the front side of the cover plate; the LED lights are installed in the movement shaft hole and around the movement shaft of the clock movement; the battery holders are mounted to the back side of the case back; the case back is installed on the case frame in a rear circumferential edge thereof.

2. The luminous electronic clock of claim 1, wherein the case frame is a multi-diameter forward tapered structure.

3. The luminous electronic clock of claim 1, wherein a sealing ring is mounted between the transparent plate and the case frame.

4. The luminous electronic clock of claim 1, wherein temperature numbers and humidity numbers are circumferentially arranged into two spaced circles, which are located near two lower lateral side of the dial.

5. The luminous electronic clock of claim 4, wherein a movement shaft hole is provided at a center of each of the circle of the temperature numbers and the circle of the humidity numbers.

6. The luminous electronic clock of claim 5, wherein the movement includes a thermometer movement and a hygrometer movement, and these movements are mounted on the back side of the case back at positions corresponding to the movement shaft holes of the circles, so that movement shafts of the thermometer movement and the hygrometer movement are separately extended through the corresponding movement shaft holes of the circles.

7. The luminous electronic clock of claim 6, wherein the case back is provided at positions corresponding to the movements with a window each.

8. The luminous electronic clock of claim 6, wherein pointers for the thermometer movement and the hygrometer movement are mounted on sections of the movement shafts of the thermometer movement and the hygrometer movement that are exposed from the front side of the dial.

9. The luminous electronic clock of claim 1, wherein the dial is spaced from the transparent plate by a certain distance via a spacer frame.

10. The luminous electronic clock of claim 1, wherein the case back is fixedly held thereto by a plurality of retaining springs.

11. The luminous electronic clock of claim 1, wherein the case back is provided near an upper portion at a middle position with a hook.

\* \* \* \* \*